United States Patent

Novak et al.

[15] 3,691,900
[45] Sept. 19, 1972

[54] CUTTER ARBOR

[72] Inventors: Ronald D. Novak, Paul S. Petersen, both of Minnetonka, Minn.

[73] Assignee: Toolmark Co., Minneapolis, Minn.

[22] Filed: April 1, 1971

[21] Appl. No.: 130,319

[52] U.S. Cl. ............. 90/11 A, 279/1 A, 143/155 R, 51/168
[51] Int. Cl. ............................ B23c 9/00, B23q 3/14
[58] Field of Search............ 279/1 R, 1 A; 143/155 R, 135 A, 143/155 B; 51/168; 90/11 A

[56] References Cited

UNITED STATES PATENTS

| | | |
|---|---|---|
| 3,643,546 | 2/1972 | Richter et al. .............. 279/1 R |
| 3,269,271 | 8/1966 | Bruckner .................. 90/11 A |
| 2,361,324 | 10/1944 | Severson .................. 279/1 R |

*Primary Examiner*—Francis S. Husar
*Attorney*—Dugger, Peterson, Johnson & Westman

[57] ABSTRACT

A cutter arbor assembly for mounting milling cutters in an arbor holder coupled to the machine drawbar to securely clamp the cutter without having substantial obstructions extending outwardly from the outer cutter face. The arbor assembly permits clamping cutters of different thicknesses and has means to insure that the machine drawbar will always release from the arbor holder before the cutter is loosened.

8 Claims, 3 Drawing Figures

PATENTED SEP 19 1972 3,691,900

INVENTOR.
RONALD D. NOVAK
PAUL S. PETERSEN
BY
Dugger Peterson Johnson & Westman
Attorneys 3,691,900

CUTTER ARBOR

BACKGROUND OF THE INVENTION

1. Field of the Invention.

The present invention relates to mounting for cutters such as those used on milling machines and the like.

2. Prior Art.

U. S. Pat. No. 3,269,271 issued to Bruckner illustrates a mounting and centering device for milling cutters which permits the mounting of the cutter in a manner to avoid substantial projections beyond the front face of the cutter. However, the Bruckner device requires intermediate centering members for proper positioning, a recessed cutter, and couples directly to the machine drawbar which makes it difficult to align at times, and difficult to readily adapt various configurations and cutters.

Bruckner also holds another patent, namely U.S. Pat. No. 3,138,997 showing a device for holding milling cutters in place. Other patents in the general field are U.S. Pat. Nos. 2,967,462 and 3,413,889.

SUMMARY OF THE INVENTION

The present invention relates to a member for holding milling cutters in a standard machine spindle using an arbor body assembly. The interior of the arbor body has an opening that receives a stud. The stud mounts an arbor that drivably passes through the arbor opening in the center of a milling cutter, and has a pilot surface for centering on the arbor body. A coupling nut is utilized with the stud to hold the cutter on the arbor body, so that the arbor body merely is slid into the standard machine spindle. A outer end of the coupler nut receives the machine drawbar for locking and driving. Friction locking means are used between the arbor body and the coupler nut to insure that when the machine drawbar is unthreaded from the coupler nut when the arbor body is removed from the machine the coupler nut will not disengage from the stud holding the cutter. Thus a simple, low cost arrangement is provided for a cutter arbor assembly that presents a substantially flat face on the outer face of the milling cutter when standard milling cutters are utilized.

The arbor bodies can be utilized with adapters so that a single arbor body can accommodate several different size milling cutters utilizing the same fastening principle.

DESCRIPTION OF THE PREFERRED EMBODIMENT

Figure 1:
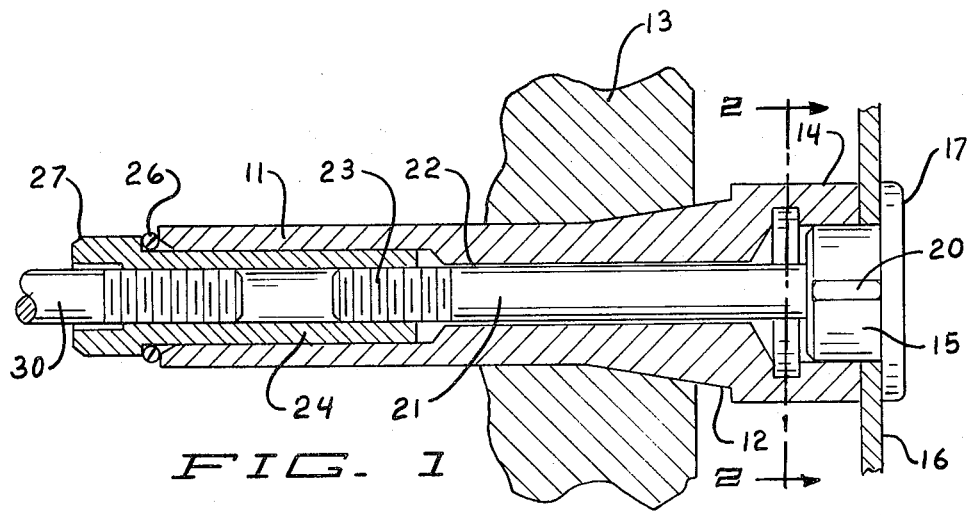
FIG. 1 is a longitudinal sectional view of an arbor made according to the present invention.
Figure 2:
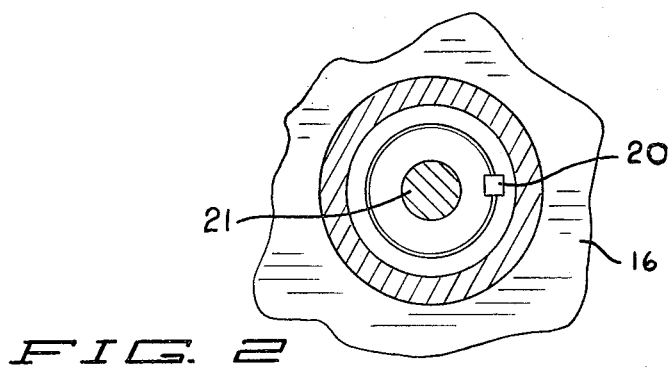
FIG. 2 is a sectional view taken as on line 2—2 in FIG. 1.

The cutter arbor illustrated generally at 10 comprises an arbor body 11 a substantial portion of which has a cylindrical outer surface. The arbor body 11 has a conically tapered outer surface 12 adjacent the other end. The tapered outer surface 12 is made so that it mates with the tapered inwardly facing surface of a machine spindle 13 of usual design in milling machines. Outwardly from the conically tapered surface 12 the arbor body has a pilot portion 14 which has an interior bore or hole which in turn receives a cutter arbor section 15 of a stud 21 that is of size to fit within the center opening of a milling cutter 16. The cutter 16 is clamped between a flange or head 17 on the cutter arbor, and the end surface of the pilot portion 14 of the arbor body. The cutter arbor section 15 slidably fits inside the internal opening in the pilot portion 14, and a key 20 is used for driving the milling cutter 16. The key 20 also prevents the cutter arbor section from rotating with respect to the pilot portion 14 of the arbor body. The interior surface of the pilot portion closely fits the outer surface of the cutter arbor section 15 so that the arbor section is held securely and properly centered.

The main portion of stud 21 is fixed to and extends outwardly from the arbor section 15, and passes through an interior bore of the arbor body 11. As shown, the bore through the arbor body 11 has a smaller diameter pilot portion 22 to guide the stud 21, and prevent the arbor section 15 from being cocked when it is slid into the pilot end 14 of the arbor body. The bore portion 22 closely clears the stud, but has sufficient clearance so that it will let the stud slide easily through. Because of the length of this bore portion 22 on the interior of the arbor body, the arbor 15 itself easily pilots its mating interior surface.

The coupler stud 21 in turn has a threaded end portion 23 that is threadably mounted into a coupler nut 24. The coupler nut fits inside the larger diameter portion of the interior bore of the arbor body, and is hand tightened with a knurled end portion 27 that is of larger diameter than the bore through the coupler body. A friction lock ring 26, which as shown is an elastomeric O-ring, fits between the shoulder portions of the knurled end 27 and the end of the arbor body 11. The ring supplies a friction force tending to resist rotation of the coupler nut when the friction lock member 26 is tightened down. Because the resilient ring 26 can be compressed substantially, there can be some movement of the coupler nut relative to the arbor body before the friction holding power is released.

A machine drawbar illustrated at 30 is threadably mounted into the opposite end of the threaded internal opening of the coupler nut 24 from the threaded end 23 of the stud 21. The machine drawbar then can be tightened up as desired, and this will tightly clamp the milling cutter 16 against the end of the arbor body, and also drive the tapered fitting of the arbor body into the machine spindle for a drive connection. The arbor body will be held in the tapered conical surface of the machine spindle 13.

The head 17 is very thin, and there is very little interference from the arbor so that the cutter can get into most places. The cutter does not have to be recessed for this close work, and there is no need to have the large nuts normally associated with milling cutters protruding outwardly from the outer face of the milling cutter.

The friction lock ring 26 insures that the coupler nut 24 will not rotate and loosen from the stud 21 when the machine drawbar is loosened. The friction ring holds the coupler nut as the machine drawbar is loosened, and provides the extra friction hold to insure that the coupler nut does not disengage from the arbor stud 21. The machine drawbar also, as can be seen, tightens the head 17 against the cutter to force the cutter against the end of the pilot portion 14 of the arbor body so that the milling cutter is very securely held.

Figure 3:
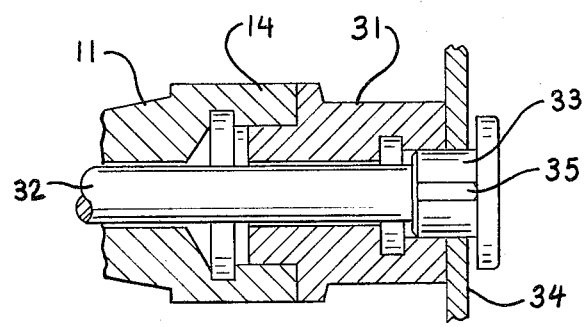
FIG. 3 is a fragmentary sectional view showing an adapter used for adapting to different diameter spindle pilot openings.

As shown in FIG. 3 the unit can be used for milling cutters having arbor openings of different size merely by using an adapter. The pilot portion or end 14 of the arbor body 11 is used to pilot and hold an adapter member 31. The coupler stud 32 is of longer length to accommodate the adapter, and the arbor 33 is of different diameter to accommodate a different milling cutter 34. A key 35 is used again as previously, and the head 36 for the arbor clamps the milling cutter against the outer end of the adapter 31 when the stud 32 is tightened down through the coupling nut with the machine drawbar as in the previous form of the invention. The adapters can be made in different diameters so that different diameter arbors can be used. The stud 32 for each of the adapters would be of sufficient length so that the end could be threaded into the coupler nut. The elastic friction ring 26 would still be utilized to insure that the machine drawbar will separate from the coupler nut before the coupler nut separates from the stud 21 or 32 that is used with the arbors.

A very simple, low cost, and fool proof arbor mounting having a very small head member to permit the cutter to be used with minimum interference with the work piece or vise is thus made. The stud is guided through the interior bore of the body, during assembly to prevent binding of the arbor. The coupler nut is applied to the stud to hold the cutter in place, and the entire body is then inserted into a standard machine spindle and tightened down with the machine drawbar. No wrench is needed to assemble the cutter to the body because the knurled coupler nut is finger tightened against the friction ring to keep the unit assembled. The drawbar clamping force holds the milling cutter, and also tightens the entire body assembly into the machine spindle for driving.

Another feature is that the end of the coupler nut engaged by the drawbar is always properly positioned with respect to the machine drawbar. The distance from the surface 12 to the end of the nut is relatively constant. Thus the location of the nut for the machine drawbar repeats and the drawbar will always be usable.

What is claimed is:

1. An arbor assembly for rotary cutters having an arbor opening and adapted to be mounted in a machine spindle having a drawbar, comprising a body member, means on said body member to position said body with respect to said spindle, a stud member, said stud including an arbor section of size to receive an arbor opening of a rotary cutter, head means on said stud engaging said cutter on its outer face to retain said cutter on said arbor section, said body having a longitudinal opening therethrough, said stud extending from a first end of said body member into said opening, a coupler nut extending into said opening from the second end of said body member and threadably engaging said stud, said coupler nut being tightenable on said stud to retain the rotary cutter against an end surface of said body, said coupler nut including means to receive said drawbar for holding the arbor assembly in said machine spindle.

2. The arbor assembly of claim 1 wherein said coupler nut has a flange positioned to bear against an opposite end of said body from said cutter whereby the stud is retained under tension by said coupler nut.

3. The arbor assembly of claim 2 and friction lock means between said flange and the adjacent end of said body member.

4. The arbor assembly of claim 2 and compressible resilient friction means between said flange and the adjacent end of the body member to provide a compressible friction member to restrain turning of said coupler nut.

5. The arbor assembly of claim 1 wherein said longitudinal opening in said body member includes a pilot end having a cylindrical pilot hole, said arbor section of said stud closely slidably fitting within said pilot hole, said pilot 6. The arbor assembly of claim 5 wherein the opening through said body member includes a guide section adjacent the pilot end hole, said guide section being slightly larger than said stud to align said stud with the axis of said pilot hole to prevent binding of the arbor section with the surfaces defining said pilot hole.

7. The arbor assembly of claim 5 wherein said pilot hole is a first diameter to receive the arbor section of a stud for a cutter having an arbor opening of a first diameter, and adapter means for cutter members having smaller diameter arbor openings than said first diameter, said adapter means comprising an adapter member having a member pilot section to slidably pilot into said body member, said stud comprising a stud having an arbor section of diameter to fit the smaller diameter arbor opening, said adapter having an internal pilot hole to receive the smaller diameter arbor section, and said stud being of length to engage the coupler nut to clamp the cutter and adapter member against said arbor body.

8. The combination as specified in claim 7 wherein said coupler nut has a flange facing the adjacent end of said arbor body member, and a resilient O-ring positioned between said flange and the end of said arbor body.

* * * * *